(12) United States Patent
Perner et al.

(10) Patent No.: US 8,330,312 B2
(45) Date of Patent: Dec. 11, 2012

(54) HYBRID BEARING AND METHOD FOR THE PRODUCTION THEREOF

(75) Inventors: Norman Perner, Neu-Ulm (DE); Benjamin Holstein, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 297 days.

(21) Appl. No.: 12/602,863

(22) PCT Filed: Jul. 2, 2008

(86) PCT No.: PCT/EP2008/005384
§ 371 (c)(1),
(2), (4) Date: May 19, 2010

(87) PCT Pub. No.: WO2009/007044
PCT Pub. Date: Jan. 15, 2009

(65) Prior Publication Data
US 2010/0225114 A1    Sep. 9, 2010

(30) Foreign Application Priority Data

Jul. 10, 2007  (DE) .......................... 10 2007 032 443

(51) Int. Cl.
*H02K 7/09* (2006.01)
(52) U.S. Cl. .......................................... 310/90.5; 310/90
(58) Field of Classification Search ................. 310/90.5, 310/90
See application file for complete search history.

(56) References Cited

U.S. PATENT DOCUMENTS

| | | | |
|---|---|---|---|
| 3,958,842 A * | 5/1976 | Telle | 310/90.5 |
| 4,340,260 A | 7/1982 | Forster et al. | |
| 4,797,009 A | 1/1989 | Yamazaki | |
| 4,988,906 A | 1/1991 | Littlefield | |
| 5,098,203 A | 3/1992 | Henderson | |
| 5,196,748 A * | 3/1993 | Rigney | 310/90.5 |
| 5,220,232 A * | 6/1993 | Rigney et al. | 310/90.5 |
| 5,739,609 A | 4/1998 | Ueyama et al. | |
| 5,851,675 A * | 12/1998 | Oyagi et al. | 428/426 |
| 6,424,067 B1 | 7/2002 | Samways | |

(Continued)

FOREIGN PATENT DOCUMENTS

DE              246597           3/1911

(Continued)

OTHER PUBLICATIONS (*) = Foreign patent document with English language abstract.

*Primary Examiner* — Quyen Leung
*Assistant Examiner* — Alex W Mok
(74) *Attorney, Agent, or Firm* — Faegre Baker Daniels LLP

(57) ABSTRACT

A hybrid bearing, comprising a first bearing shell with a sliding face and a second bearing shell with a second sliding face, with the first sliding face and the second sliding face being located opposite one another at a bearing gap. The first bearing shell comprises a first support body and the second bearing shell comprises a second support body. Elements which are made of slide bearing material are attached to the first support body and to the second support body, with the elements made of slide bearing material forming at least part of the first sliding face and of the second sliding face. Permanent magnets are connected to the first support body and the second support body, with the permanent magnets being arranged spaced apart from the first sliding face and the second sliding face.

22 Claims, 9 Drawing Sheets

U.S. PATENT DOCUMENTS

| | | | |
|---|---|---|---|
| 6,833,643 B2 * | 12/2004 | Beyer et al. | 310/90.5 |
| 7,190,087 B2 | 3/2007 | Williams | |
| 2003/0155830 A1 * | 8/2003 | Beyer et al. | 310/90.5 |
| 2007/0007772 A1 | 1/2007 | Brashears | |
| 2007/0040464 A2 * | 2/2007 | Sun et al. | 310/90.5 |
| 2007/0069597 A1 * | 3/2007 | Taniguchi et al. | 310/90.5 |

FOREIGN PATENT DOCUMENTS

| | | |
|---|---|---|
| DE | 29 38 809 | 4/1981 |
| DE | 32 17 341 | 3/1983 |
| DE | 241 288 | 12/1986 |
| DE | 37 33 117 | 4/1988 |
| JP | 4-203523 | 7/1992 |
| JP | 5-141425 | 6/1993 |
| JP | 11-182547 | 7/1999 |
| JP | 2002-364639 | 12/2002 |
| JP | 2005-14255 | 1/2005 |
| WO | 2006/022554 | 3/2006 |
| WO | 2006/074070 | 7/2006 |

* cited by examiner

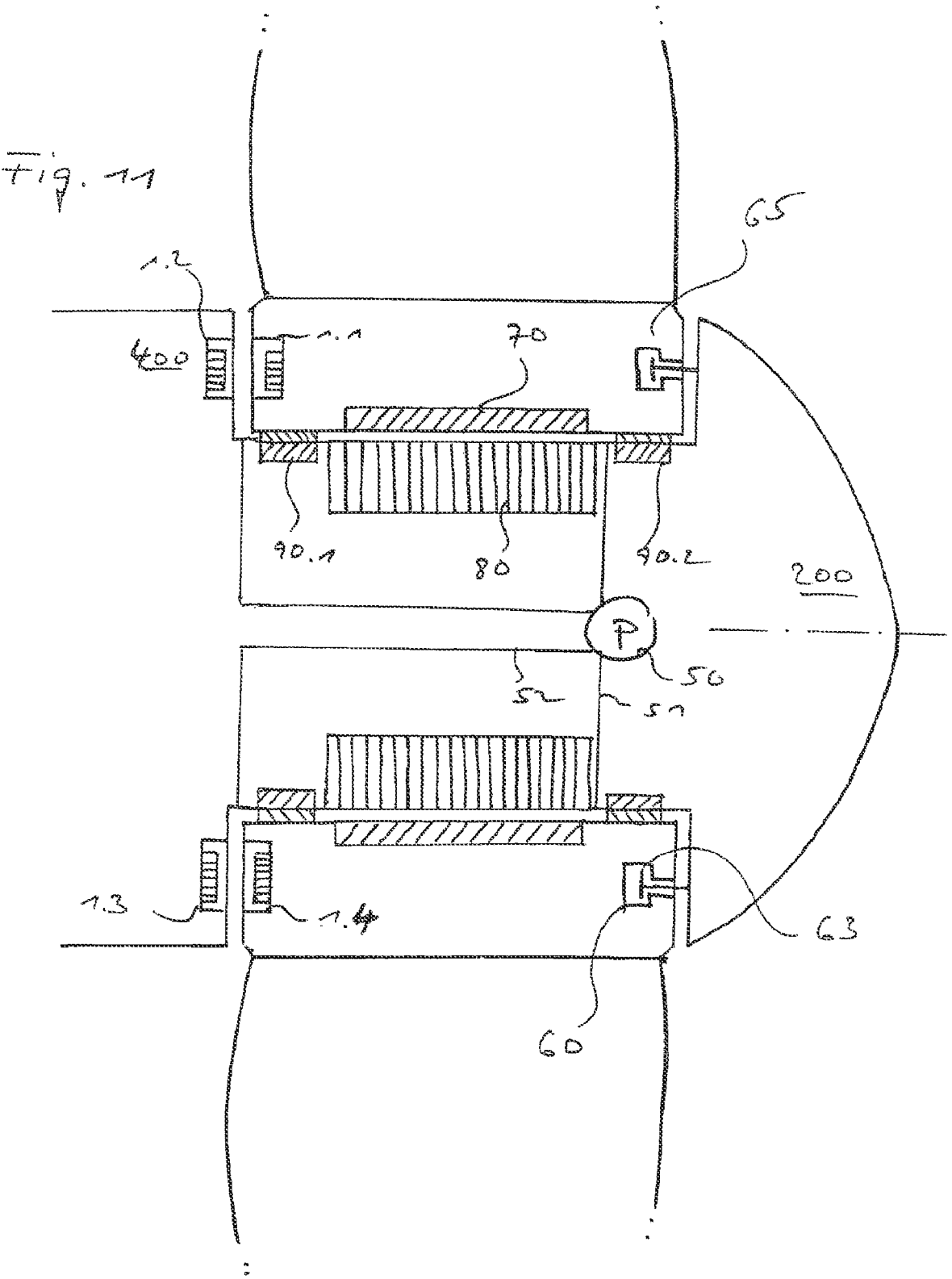

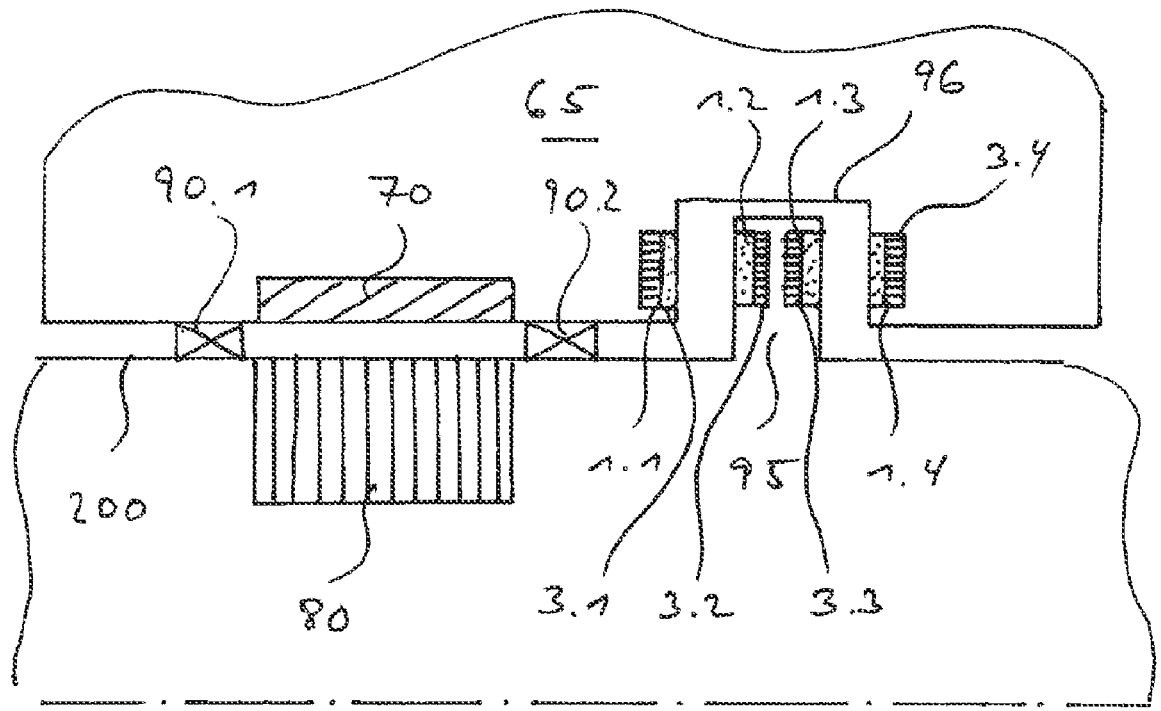

HYBRID BEARING AND METHOD FOR THE PRODUCTION THEREOF

CROSS-REFERENCE TO RELATED APPLICATION

This application is related to and claims the benefit under 35 U.S.C. §119 and 35 U.S.C. §365 of International Application No. PCT/EP2008/005384, filed Jul. 2, 2008, the reference of which is expressly incorporated herein by reference.

BACKGROUND

The invention relates to a hybrid bearing in the form of a combination of a slide bearing and a magnetic bearing, for example, for use in bearing the revolving units of an underwater power generation plant, and a method for its production.

Underwater power generation plants are used for power generation, especially electric power generation, from a sea or ocean current, with tidal currents being considered for the latter. In the present application, an underwater power generation plant shall be understood as being a turbine/generator unit which is attached to a support structure, with water flowing freely around the same, and for which no dam structure is required. The foundations for the support structure can either be laid on the ground of the water body or a floating unit is used alternatively which can be held in position by means of anchoring. The revolving water turbine of such a power generation plant must be held in such a way that the absorbed current forces and the weight of the water turbine, including the shaft components connected with the same, are supported in a secure manner.

In the case of a directly driven underwater power generation plant, no transmission is interposed between the electric generator and the water turbine, so that the rotor unit of the electric generator forms a modular unit with the water turbine and especially a hub-like support structure. Consequently, the forces caused in this configuration by the electric generator need to be intercepted by the bearings for the module consisting of water turbine and generator rotor.

There is a necessity for underwater power generation plants that they are provided with a sturdy configuration in order to limit to an absolute minimum or avoid entirely the mostly difficult maintenance work. This leads to a demand on the bearing of such an installation that it is arranged to be failure-proof in the prevailing ambient conditions in a flow that mostly transports sediments and sand. In the case of an underwater power generation plant which is arranged in an ocean current, the problems concerning a corrosive salt water environment is added to this difficulty. The mentioned requirements for the bearings also occur in other heavy-duty machines which are provided especially for the use under rough ambient conditions.

Bearings for the use in underwater power generation plants are often arranged as single-row or multiple-row rolling bearings. However, the rolling bodies used in rolling bearings are often susceptible to the abrasive effect which is caused by the sediments penetrating the bearing. A high amount of effort needs to be employed in sealing such bearings. In order to provide bearings with a robust configuration it was proposed in US 2007 0007772 A1 for example to use a slide bearing in which water is pressed between the bearing surfaces in order to form a water film. With the help of this bearing, an external rotor which consists of two rotors and comprises an arrangement of permanent magnets is held in the respective support ring on a gondola body in which the stator components are housed. The disadvantageous aspect in such a hydrodynamic slide bearing is however that even in the case of pumps of large configurations a sufficiently stable lubricant film between the bearing surfaces cannot be maintained permanently in many cases at low revolving speeds of the water turbine and consequently a mixed frictional state is obtained in the bearing with percentages of dry friction and wet friction, leading to respective bearing losses. It is a further disadvantage that the pump units associated with the bearing need to be provided very powerful configuration and further represent additional components with respective failure probability for the underwater power generation plant.

SUMMARY

Furthermore, U.S. Pat. No. 7,190,087 B2 describes different arrangements for a generic underwater power generation plant of axial and radial bearings for a hub carrying the water turbine and the components of the generator rotor. It is proposed in addition to rolling and slide bearings to realize the bearings by means of permanent magnets. The difficulty in such an approach is stabilizing the bearings even under high loads of the bearings and it needs to be noted that a magnetic bearing is a system capable of oscillating. When the concept of a conventional slide bearing is combined with that of a passive magnetic bearing, the capacity of resistance to wear can be improved. This has already been proposed by DD 241288 A1 for small-size hydro-machines such as a canned motor in a heating circulating pump. Furthermore, such hybrid bearings are disclosed by DE 246597 A1 and DD 3217341 A1. For large-size bearings such as those of underwater power generation plants, and especially the directly driven ones, a typical diameter of a bearing is over two meters, so that bearing shells as proposed in the above specifications made of a magnetic material, especially a hard ferrite, has not yet been considered. The difficulty was to produce large-size bearing shells simultaneously designed for high bearing loads with sufficient precision that were economical at the same time.

The invention, in a preferred form thereof, is based on the object of providing a bearing which can be designed for large bearing loads, can be arranged in a large size and is simultaneously simple in respect of construction and production. Moreover, the bearing should be free from wear and tear especially for the application in an underwater power generation plant when foreign bodies penetrate the bearing gap from the ambient environment or the bearing components are subjected to a corrosive influence. The bearing should also be characterized in such a way that there are low coefficients of friction even in the case of low revolving speeds.

The starting point is a slide bearing with a first and second bearing shell, with a lubricant being present preferably in the bearing gap between these two bearing shells. It can have semi-fluid properties, with an oil or grease being used. However, the use of a low-viscous lubricant such as water is possible, which is to be especially considered for the case of the preferred application in an underwater power generation plant. The bearing can be sealed against the ambient environment by means of a sealing element. Alternatively, it is possible to work with a once-through lubrication.

In order to leave the range of dry and mixed friction at low circumferential speeds and to reach the range of wet friction with an associated low coefficient of friction as a result of the hydrodynamic effect of the lubricant in the bearing gap, the slide bearing is supplemented by a magnetic bearing. This hybrid bearing is realized in accordance with the invention in such a way that the mutually facing bearing shells (first and second bearing shell) each comprise a support body. In the following, these support bodies are designated as first support body and second support body according to the allocation to the first bearing shell and the second bearing shell. Each support body accommodates elements made of slide bearing material and permanent magnets. The elements made of slide bearing material form a segmented sliding face, whereas the permanent magnets are inserted into the support body in such a way that they are spaced from the sliding face. The elements made of slide bearing material and the permanent magnets can each be connected as separate individual parts with the first support body and the second support body. An arrangement is preferable however for which one sliding magnetic body is used which comprises an element made of slide bearing material and a permanent magnet. Accordingly, such a sliding magnetic body forms a component which, after insertion, comprises a part which faces towards the sliding face and which is formed by the element made of a slide bearing material, and comprises at least one permanent magnet which is covered by the element made of slide bearing material.

Accordingly, components are used as sliding magnetic bodies which are small, whose production is manageable and which can be produced in large numbers. Uniform sliding magnetic bodies are preferably used. However, embodiments of the invention are also possible in which two or more different variants of sliding magnetic bodies are fastened to a support body of the bearing. There can be differences in the size, choice of material and the chosen geometry. It is further possible to start out from sliding magnetic bodies which are of the same design and to merely adjust the magnetization strength and/or the magnetization direction of the permanent magnet accommodated in the same.

According to a preferred arrangement, the sliding magnetic bodies are inserted in recesses in the support body and are connected there in a positive, non-positive or firmly bonded manner with the support body. A combination of different types of connection is also possible. The insertion of the sliding magnetic bodies preferably occurs in a perfect fit. A step-free sliding face is especially produced by grinding in the same. According to an alternative embodiment, the separate magnetic sliding bodies are placed on a support body without any recesses. This can occur for example by means of a firmly bonded connection, e.g. a glued connection. It is further possible to arrange the connection between the sliding magnetic bodies and the support body in such a way that the sliding magnetic bodies are able to perform a tilting motion relative to the support body at least to a certain extent. This enables adapting the sliding face during the movement of the bearing, which sliding face which is formed by the entirety of the sliding magnetic body, to the respective geometry of the counter-surface which on its part is formed by the sliding magnetic body on the opposite support body. Elastic components can be associated with such a fastening of the sliding magnetic bodies which is tiltable to a certain extent, so that every single sliding magnetic body follows the opposite sliding face in the course of the bearing motion as precisely as possible in order to minimize bearing play and the resulting oscillating capability to the highest possible extent.

A metal such as bronze, antifriction metal or an alloy with lead or aluminum can be used as a slide bearing material. Slide bearing materials on the basis of plastic constitute an alternative. A ceramic material, especially a fiber-reinforced ceramic material, is used in an especially preferred way for the elements made of slide bearing material in accordance with the invention, because as a result of the high material hardness of the ceramic material the sliding face will remain substantially intact in an unchanged manner even in the case of an intrusion of abrasive media into the slide bearing.

For a preferred embodiment, the elements made of slide bearing material cover the permanent magnets towards the running surface, the surface of the installed slide magnetic body which faces the bearing gap becomes part of the segmented slide surface in the inserted state of the slide magnetic body and after the preferably performed grinding in of the sliding face. When the sliding magnetic bodies are inserted into recesses of the support bodies, the sliding face is formed by the material of the support bodies of the respective bearing shell in the intermediate region between the elements made of slide bearing material.

When ceramic elements are used as slide bearing material, one disadvantage of the ceramic material, which is the low fracture toughness that can lead to brittle fracture, can be compensated by the preferred embedding of the elements made of slide bearing material in the support bodies of the bearing shell. This applies especially when a metallic material, especially a non-corrosive steel, is used as a support body. Other sufficiently ductile materials such as plastic materials, especially fiber-reinforced plastic materials, can be used as support bodies. It is further possible to produce the ceramic elements of the sliding magnetic bodies as ceramic composite materials, which means fiber-reinforced ceramics are preferably employed in which embedded ceramic long fibers are used, which can be SiC, $Al_2O_3$ fibers or mixed crystals of $Al_2O_3$ and $SiO_2$. Ceramic materials such as SiC or silicon-enriched SiC or $Al_2O_3$ can be used between these fibers as possible ceramic materials.

At least one permanent magnet is received in each sliding magnetic body, in addition to the element made of slide bearing material, as explained above. Rare earths are suitable as materials for permanent magnets such as cobalt samarium ($Sm_2Co_{17}$) and neodymium/iron/boron ($Nd_2Fe_{14}B$), with the latter high-performance magnets being characterized by an especially high energy product and cobalt/samarium permanent magnets being used as high-performance magnets in the case of higher temperatures. The permanent magnets can comprise a protective layer, e.g. a nickel protection coating, depending on the type of introduction and connection with the element made of slide bearing material. This is not necessary when for example a ceramic element completely encloses the permanent magnet and no part of the surface of the permanent magnet is exposed to the surface of the sliding magnetic body.

In accordance with a first embodiment, the permanent magnet and the element made of slide bearing material are produced separately and joined in a subsequent protection step for forming the sliding magnetic body by means of a glued connection for example. This production variant comes with the advantage that both individual components are not adjusted to one another in their production methods, but only need to be produced as a perfect fit. In accordance with an alternative arrangement, in which a ceramic material is used as a slide bearing material, a non-sintered permanent magnet, which means one that is pressed merely isostatically in a magnetic field, is placed in a ceramic green compact, with the following sintering step being performed jointly. This leads to an advantageous sintered material connection between permanent magnet and ceramic element. Furthermore, it is possible in this production method to accommodate the permanent magnet completely in the ceramic element in a simplified manner, so that the permanent magnet is enclosed on all sides by the inert ceramic material. It is necessary for such an arrangement of the process to adjust the sintering temperatures. Usually, this will lead to a reduction in the sintering temperature for the ceramic material to approx. 1000 to 1200° C., which is advantageous however in the case of a fiber-bonded ceramic material.

In accordance with a further embodiment of the production of the sliding magnetic body, the element is produced from slide bearing material in a first method step. Then there is the forming of a polymer-bonded permanent magnet, with the plastic material of the permanent magnet being pressed at first by means of an injection molding method into a recess of the element made of slide bearing material or being applied to one of its side surfaces. Embodiments are possible for which the permanent magnet is produced at first and it is enclosed at least partly by an element made of slide bearing material in order to complete the sliding magnet body, which element is applied directly to the permanent magnet itself. In the case of a ceramic element, a fiber structure can be fastened to the permanent magnet for example, with the intermediate spaces in the fiber structure being filled by a ceramic material, e.g. by means of a CVI process (Chemical Vapor Infiltration). As a result, silicon carbide can be separated from the gas phase, with silicon carbide being formed from a mixture of hydrogen which is used as a catalyst and methyltrichlorosilane on a matrix heated up to approx. 800° C. and is inserted in the fiber matrix.

By using elements made of slide bearing material and permanent magnets, it is possible to prefabricate a large number of identical elements as modules and to apply the same at the points of the support body provided for this purpose. This insertion occurs in such a way that the magnetization direction of the permanent magnets is aligned substantially perpendicular to the sliding face. It is possible in this case to set the magnetization directions on the first bearing shell and the second bearing shell in such a way that either an attractive or a repulsive interaction of the bearing shells is achieved. It is further possible to arrange the permanent magnets in relation to the sliding face in such a way that a certain tilting angle of the magnetization direction to the surface normal is obtained. The smallest possible angle of less than 10° is generally preferred. It is possible however to fasten at least a part of the sliding magnetic body to the support body in such a way that the magnetization direction of the respective permanent magnets produces a partial force component which is directed transversally to the surface normal of the sliding face. This can be the case especially for sliding magnetic bodies which are arranged at the edge of a bearing shell, e.g. a radial bearing, so that they are used in addition for centering the bearing shell in addition to the support in the main direction of bearing. In the case of a radial bearing, the sliding magnetic bodies attached to the boundary regions of the bearing shell can be magnetized in such a way that a centering of the bearing components occurs, which means that a support of bearing forces in the axial direction is additionally provided.

For an alternative embodiment, the magnetization direction of the permanent magnets is aligned substantially tangentially to the sliding face after their installation or the installation of the sliding magnetic bodies into the support bodies which comprise the same, with an alternating arrangement in the circumferential direction being preferred. Furthermore, for the preferred joining of the element made of slide bearing material and the permanent magnet into a sliding magnetic body, it can be arranged in such a way that it comprises additional components. They can be load-dissipating structural components or filling materials for the corrosion-proof encasement of the permanent magnet. Moreover, materials for flux guidance can be provided in order to save permanent magnet material without substantially weakening the magnetic forces in the bearing gap. For soft-magnetic flux guidance, ferromagnetic materials such as iron, nickel and cobalt are used especially.

The magnetic bearing forces applied in accordance with the invention lead to a stabilization of the bearing and to maintaining a mean gap distance during operation, so that a fluid film of the lubricant can form in a stable manner therein and the damping, static and hydrodynamic effects of the lubricants can apply, with the range of fluid friction being achieved by this measure already at low circumferential speeds. Furthermore, the arrangement of the sliding magnetic bodies depending on the load is adjustable, with the distribution of the permanent magnets and thus the strength of the magnetic force introduced into the bearing being locally adjustable in the case of a mean asymmetric load. It is also possible to provide a locally adjusted distribution of repulsive and attractive pairs of magnets on the first and second bearing shell. It is further possible to homogenize the applied magnetic force by the chosen distribution of the permanent magnets in the support bodies associated with the first and second bearing shell.

The hybrid bearing in accordance with the invention can be used for different bearing arrangements, e.g. as a radial bearing, especially for arranging the bearing of a hub of an underwater power generation plant. Moreover, a hybrid bearing arranged in accordance with the invention can support axial forces in such a plant, with a single-side or double-side axial bearing being formed depending on the application, which means the intended direction of inflow. It is further possible to intercept both axial and radial forces by the use of a hybrid bearing in accordance with the invention in an angular arrangement of the bearing.

According to further advantageous embodiments, the hybrid bearing can be associated with a pump unit for pressing lubricant into the bearing gap, which additionally promotes the transition of the friction characteristics from dry friction or mixed friction to wet friction. It is possible to provide damping elements for further stabilization of the hybrid bearing, which damping elements can be made from a rubber-elastic material for example. They are preferably in connection with one of the two bearing shells and protrude into the bearing gap, which means the bearing gap associated with the damping elements is smaller than the middle bearing gap between the sliding faces on the first and second bearing shell, so that these damping elements rest at certain points on the opposite bearing shell during oscillations of the bearing shell and cause an elastic counter-force and energy dissipation. Alternatively, such damping elements can be arranged parallel to the actual magnetic slide bearing in order to achieve the desired suppression of oscillations. It is further possible to use the stabilization of the bearings by means of additional damping elements only for certain degrees of freedom of the movement of the bearings.

BRIEF DESCRIPTION OF THE DRAWINGS

The invention is now explained in closer detail with reference to embodiments shown in the drawings which show in detail:

FIG. 11 shows an axial bearing arranged in the circumferential region of the hub of an underwater power generation plant;

FIG. 12 shows a further arrangement of an axial bearing in accordance with the invention for supporting bidirectional axial forces.

DETAILED DESCRIPTION

Figure 1:
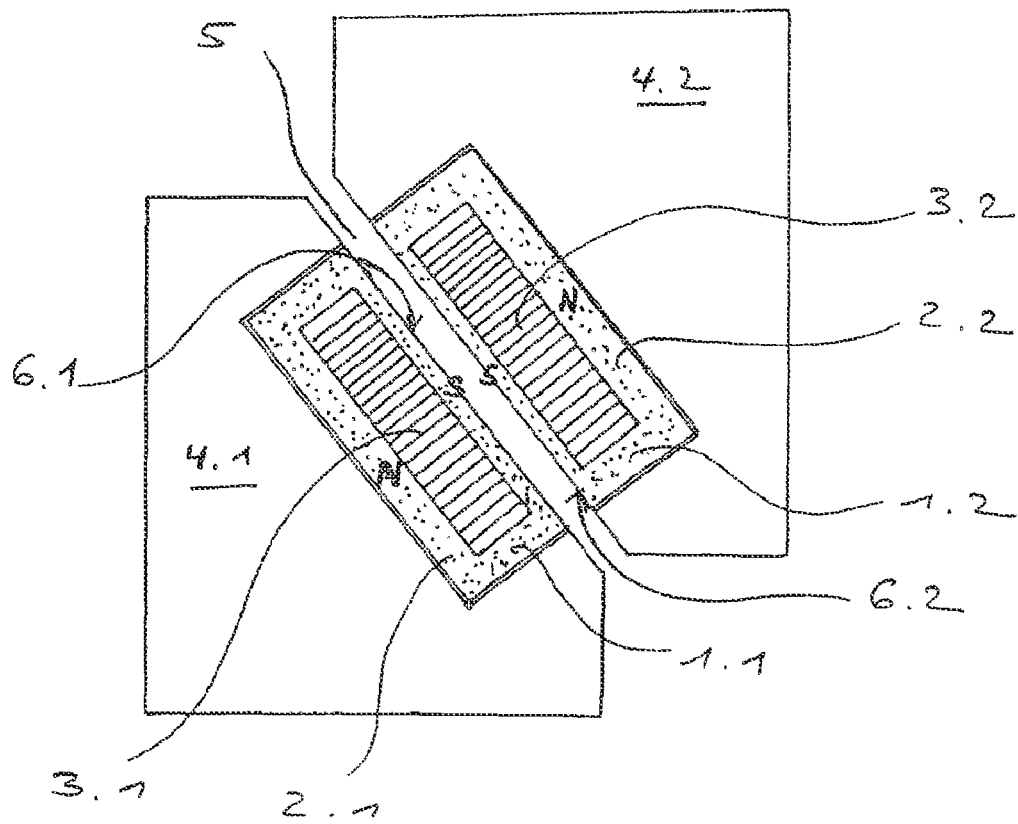
FIG. 1 shows a schematically simplified cross-sectional view of a hybrid bearing in accordance with the invention.

FIG. 1 shows a schematically simplified section view of parts of a first bearing shell and a second bearing shell of a hybrid bearing in accordance with the invention, with each of the bearing shells comprising a support body 4.1 and 4.2. They are separated from each other by a bearing gap 5. Sliding magnetic bodies 1.1, 1.2 are inserted in the support bodies 4.1, 4.2, which sliding magnetic bodies each consist of one element made of slide bearing material 2.1, 2.2 and an incorporated permanent magnet 3.1, 3.2. The magnetization directions of the permanent magnets 3.1, 3.2 extend substantially perpendicular to the sliding faces 6.1, 6.2 of the hybrid bearing for the embodiment as shown in FIG. 1, with the two illustrated permanent magnets repelling one another in the illustrated embodiment and thus lift off the two bearing halves from each other.

Figure 2:
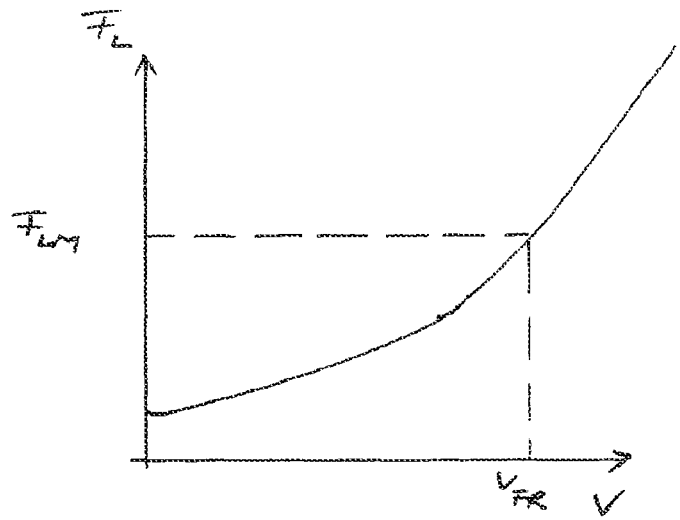
FIG. 2 shows a diagram of the dependence of the bearing forces on the circumferential speed of a water turbine supported on the bearing.

FIG. 2 shows a schematically simplified view of the curve of the bearing forces for a bearing unit revolving at speed V. This can be the hub part of a water turbine for an underwater power generation plant for example. An increase in the revolving speed in a water turbine arranged for speed-variable operation is linked to a higher speed of the ambient flow, so that the bearing forces will rise accordingly. From a specific speed $V_{FR}$, the lubricant entrained by the revolving motion will form a productive film in a hydrodynamic manner, so that the mixed frictional state will be left and there will be substantially wet friction in combination with a considerable reduction of the coefficient of friction in the slide bearing. In accordance with the invention, an additional magnetic bearing force is generated in a contactless manner by the permanent magnets provided in the hybrid bearing. Preferably, this mean magnetic bearing force $F_{LM}$ is set in such a way that at speeds beneath the transition to wet friction, which means at speeds lower than speed $V_{FR}$, the magnetic forces will relieve the slide bearing substantially. As a consequence, the coefficient of friction will decrease even at lower speeds beneath $V_{FR}$ or the transition to wet friction will be achieved already at low relative speeds of the two bearing halves.

Figure 3:
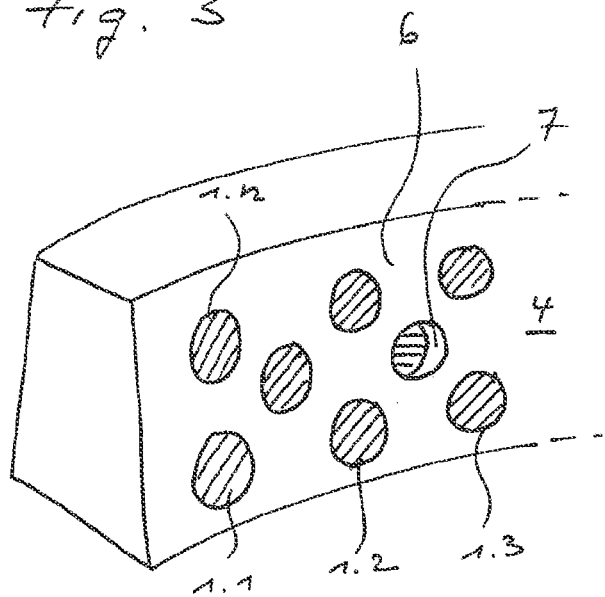
FIG. 3 shows a top view of the support body of a bearing shell in accordance with the invention.

FIG. 3 shows a support body 4 of a bearing shell with sliding magnetic bodies 1.1, 1.2, 1.3, . . . , 1.n of a bearing shell which are accommodated in the same. They are inserted in recesses 7 of the support body 4 and have a circular form in the illustrated embodiment. A typical diameter of the bearing is approx. 2 m for a large-size bearing, e.g. a radial bearing for the hub of a directly driven underwater power generation plant. The sliding magnetic bodies 1.1, . . . , 1.n can have a diameter of 50 mm for example for the illustrated embodiment. The permanent magnets which are embedded in the sliding magnetic bodies are covered by a supporting layer with a slide bearing material towards the sliding face 6 and generate a magnetic field in the present embodiment with a magnetic induction of B≈1–1.3 T. It is formed by slide bearing material of the sliding magnetic bodies 1.1, . . . , 1.n of the surfaces of the elements facing the bearing gap. Between these slide bearing material surfaces, the material of the support body 4 preferably becomes part of the sliding face 6, with the embedding of the sliding magnetic bodies 1.1, . . . , 1.n in the support body occurring in a flush and non-stepped way according to an advantageous embodiment. The freedom from steps is advantageously produced by a final grinding step in which the shape of the sliding face is produced.

Figure 4A:
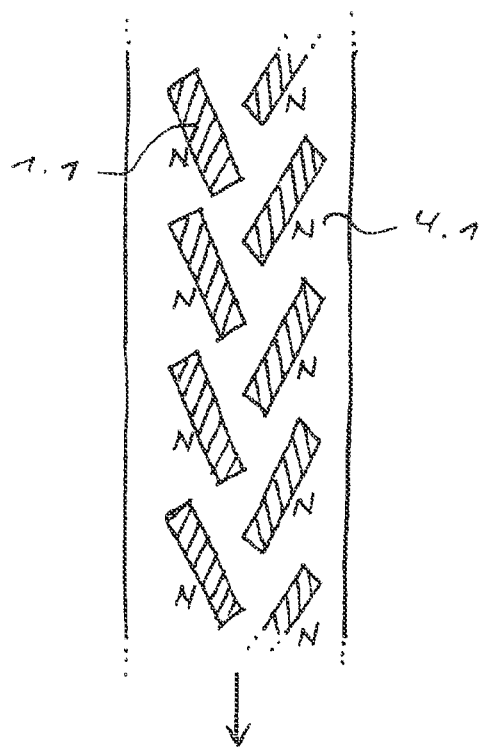
FIGS. 4a and 4b show a schematically simplified top view of an embodiment for a distribution of the sliding magnetic bodies on the support bodies of a hybrid bearing in accordance with the invention.
Figure 4B:
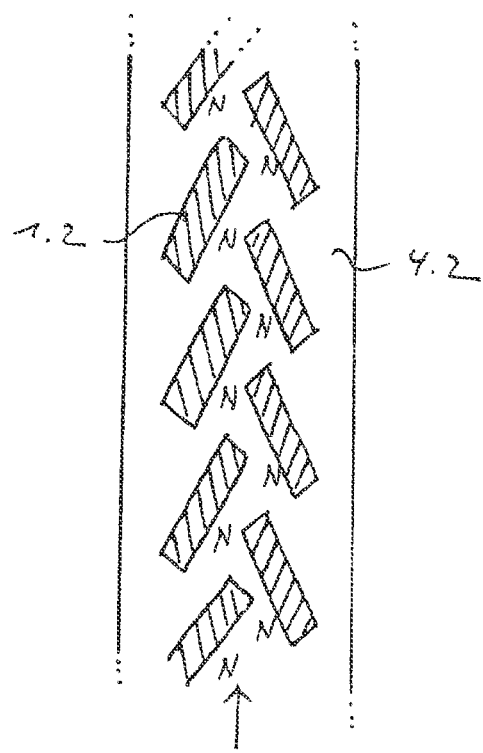

FIGS. 4a and 4b shows a herringbone arrangement of rectangular sliding magnetic bodies 1.1 and 1.2 on two support bodies 4.1, 4.2, which are opposite of one another at the bearing gap in the assembled state. As a result of the mutually linked arrangement, the progression of the magnetic forces in the hybrid bearing is homogenized. It is further possible for this purpose to fasten sliding magnetic bodies of different size or arranged in an irregular way to the support bodies.

Figure 5:
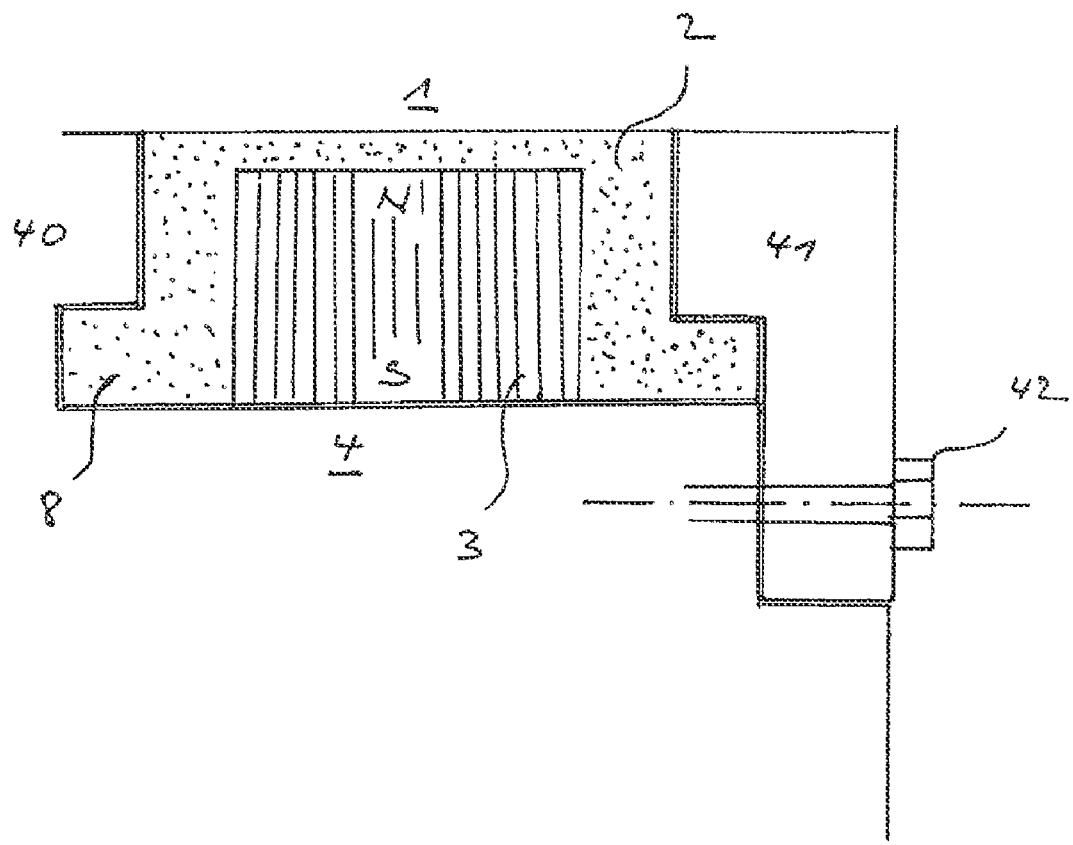
FIG. 5 shows an interlocking fixture of a sliding magnetic body on the support body of the hybrid bearing.

FIG. 5 shows a fastening variant for a sliding magnetic body 1 in the support body 4. In this case, the element which is made of slide bearing material 2 and encloses the permanent magnet 3 is provided with a flange which engages in a recess of a first partial component of the support body 40. A second partial component of the support body 41 encompasses the free end of said flange 8, with the sliding magnetic body 1 being fastened in an interlocking manner to the support body 4 by means of a fastening means, which is typically a screw. In addition, this interlocking connection can be improved by a material-bonding connection method. An additional gluing of the sliding magnetic body 1 in the support body 4 can be considered in this case. In addition or as an alternative, the sliding magnetic body 1 can be fastened in a frictionally engaged manner in a recess of the support body 4. An exclusively material-bonded connection is also possible.

Figure 6:
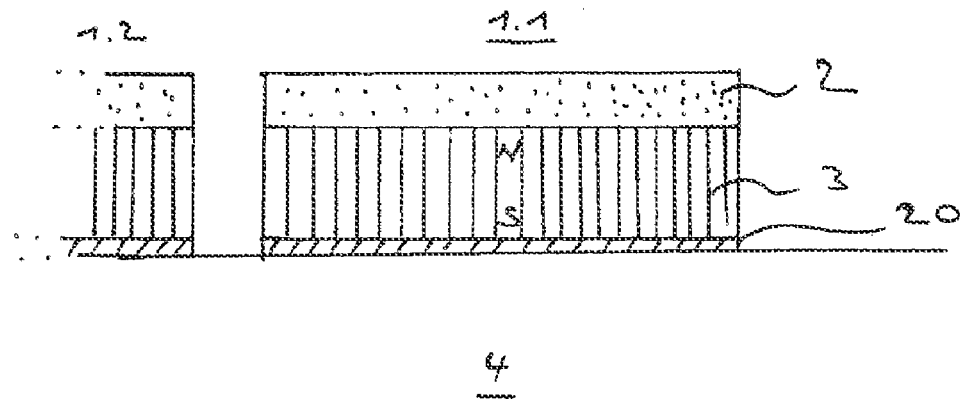
FIG. 6 shows a further embodiment of the hybrid bearing in accordance with the invention with sliding magnetic bodies placed on the support body.

FIG. 6 shows an embodiment in which the sliding magnetic bodies 1.1, 1.2 are not inserted in recesses of the support body 4, but are placed on the same. This is advantageous from a production standpoint as compared with the variants explained above. However, a lateral hold for the respective sliding magnetic bodies is missing. Advantageously, the placement of the sliding magnetic body 6 on the support body 4 can be connected to a further development in which the sliding magnetic body 1.1, 1.2 is able to perform a tilting motion relative to the support body 4 to a certain extent. According to a possible variant, an elastic element 20 is provided for this purpose between the sliding magnetic body 1 and the support body 4, which element provides the sliding magnetic body 1 with a certain amount of freedom of movement in relation to the support body and, at the same time, produces an elastic counter-force against a deflection from the idle position, so that the sliding magnetic body 1, when sliding on the opposite surface, is able to follow its contour as precisely as possible.

Figure 7:
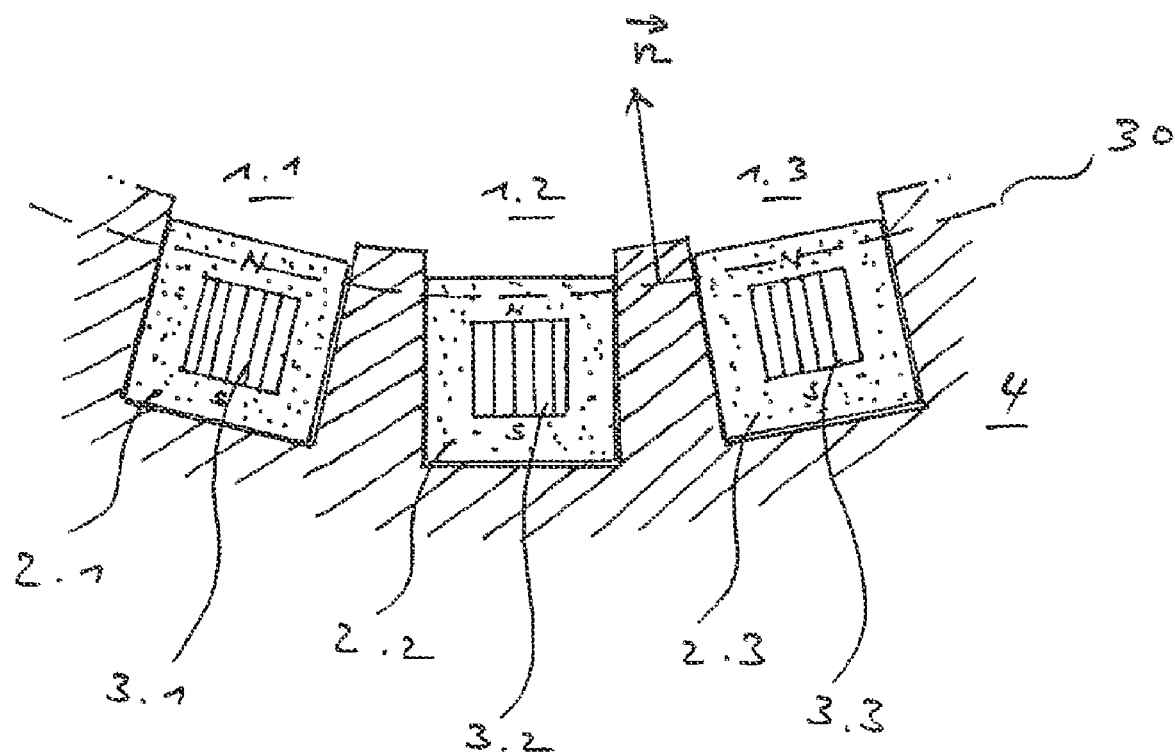
FIG. 7 shows a sectional view of sliding magnetic bodies placed in recesses of the support body before the final processing step, in which the final contour of the sliding face is produced.

According to a preferred embodiment of the invention, a ceramic element is used as an element made of slide bearing material. This offers the possibility to combine the final sintering of the permanent magnet with the sintering of the ceramic element. For this purpose, an isostatically pressed permanent magnetic is joined with a ceramic green compact. It is possible in this case to embed the permanent magnet according to the illustration of FIG. 7 (see reference numerals 3.1, 3.2 and 3.3) in the non-sintered ceramic elements which form the elements made of slide bearing material 2.1, 2.2 and 2.3. In the subsequent sintering step, there is a materially bonded sintered connection between the permanent magnet and the ceramic element. Prior to the insertion of the thus produced sliding magnetic bodies 1, they can be reworked and subjected to a final magnetization step. The magnetic supporting forces in the hybrid bearing can be set via the magnetization strength. In accordance with FIG. 7, such a magnetization direction of the permanent magnets 3.1, 3.2 and 3.3 of the sliding magnetic bodies 1.1, 1.2 and 1.3 is chosen and they are inserted in support body 4 in such a way that the magnetization direction corresponds substantially to the normal direction n of the later sliding face. In accordance with FIG. 7, the sliding faces 6 are ground in after the mounting step in which the sliding magnetic bodies 1.1, 1.2 and 1.3 are inserted into recesses provided for this purpose in the support body. The contour of the sliding face 30 is shown with the broken line, so that for forming the sliding face it is necessary to remove both parts of the slide bearing material of the sliding magnet bodies and material on the support body 4 by the final machining step. Machining with diamond tools are considered in this case, also by a combined milling, grinding and polishing process. It is possible in accordance with one embodiment to grind in a ribbing in the sliding face which promotes the formation of a supportive lubricant film. These can also be wedge and/or latching surfaces. Lubricant grooves can also be embedded in the sliding faces.

Figure 8:
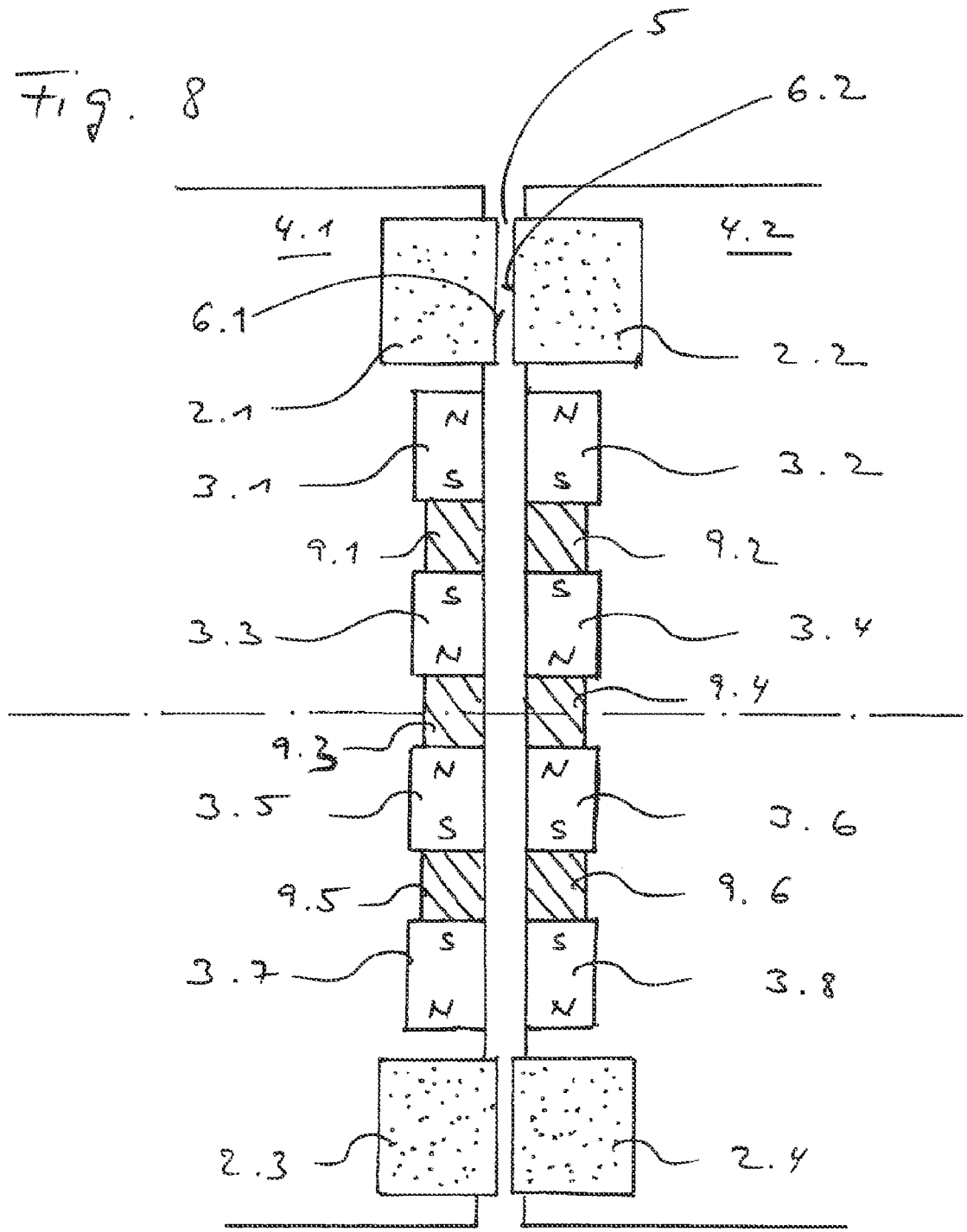
FIG. 8 shows a variant of an embodiment with separate elements made of slide bearing material and permanent magnets.

FIG. 8 shows an alternative embodiment for which the elements made of slide bearing material and permanent magnet are not joined into modules forming sliding magnetic bodies. This is shown by reference to an axial bearing shown in a schematic simplified illustration. Individual elements made of slide bearing material 2.1, 2.2 are arranged opposite of one another in the bearing gap 5 in the first support body 4.1 and the second support body 4.2. They slightly protrude in relation to the surfaces of the support bodies on the bearing gap 5, so that they form the first sliding face 6.1 and the second sliding face 6.2. The elements made of the slide bearing material 2.1, 2.2 are inserted into depressions in the first support body 4.1 and the second support body 4.2, which protects the same by lateral holding and securely dissipates the forces introduced during the sliding. Permanent magnets 3.1, 3.2, 3.3 and 3.4 are arranged opposite of one another in the bearing gap 5 in a second group of recesses in the support bodies 4.1, 4.2. The direction of magnetization runs substantially rectangular to the surface normal of the sliding faces 6.1, 6.2 in the illustrated embodiment. Furthermore, the magnetization of mutually adjacent permanent magnets 3.1 to 3.*n* is directed on each of the support bodies opposite of one another. Furthermore, a soft-magnetic material is arranged between permanent magnets with opposite direction of magnetization in the illustrated embodiment. This measure ensures that the magnetic field is guided in the direction of the surface normal to the respective sliding face 6.1, 6.2, so that the desired relief of the slide bearing is achieved by the magnetic forces between the two bearing shells. A soft-magnetic material can also be provided for the sliding magnetic body of the preceding embodiments. Moreover, an orientation of the direction of magnetization of the permanent magnets according to the embodiment shown in FIG. 8 is also possible for these combined components. It is further possible to provide a sequence of mutually opposite magnetic poles on the face surfaces of the permanent magnets in a parallel orientation of the direction of magnetization. Such an embodiment is not shown in detail in the drawings.

Figure 9:
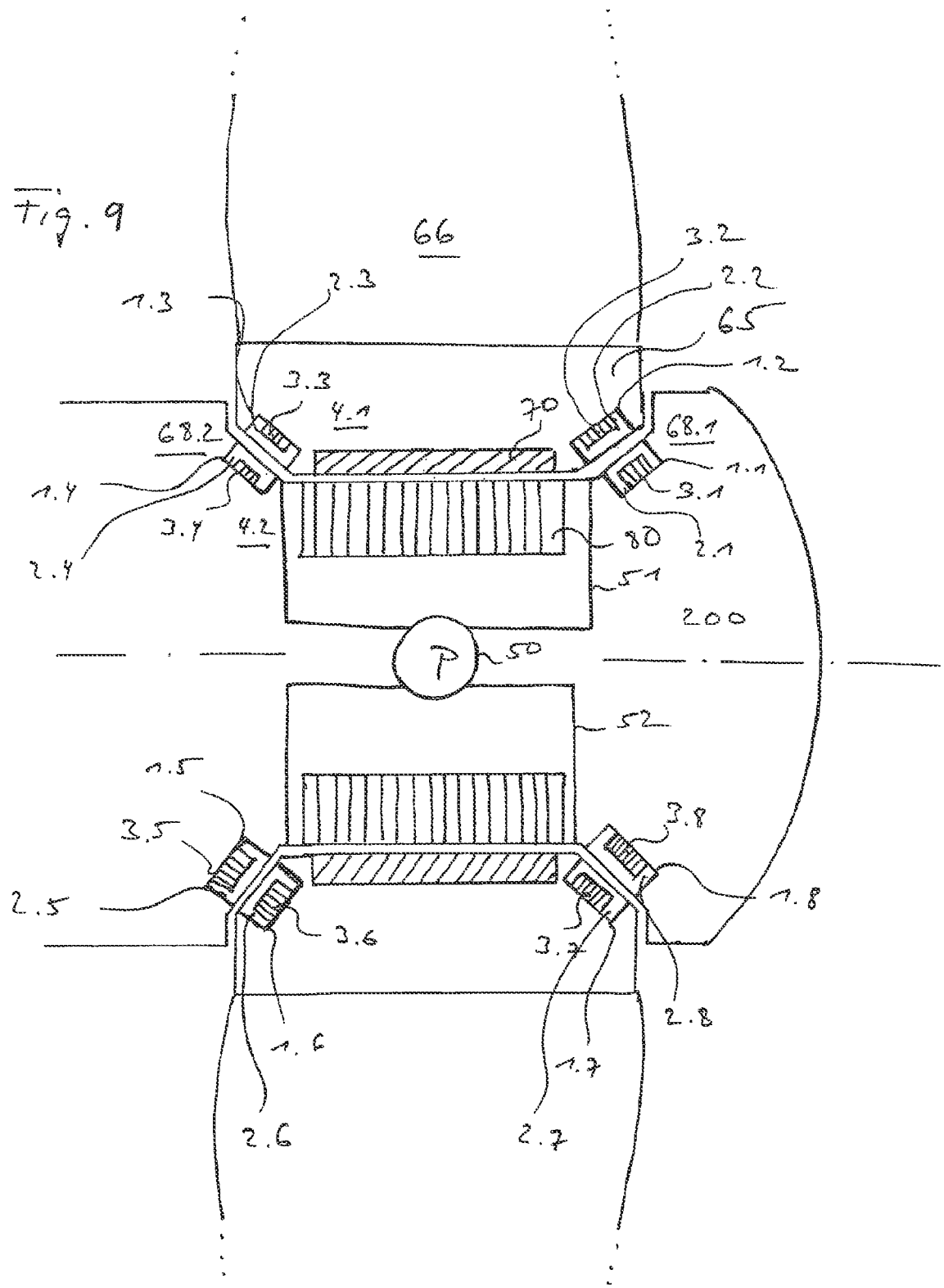
FIG. 9 shows the use of a hybrid bearing in accordance with the invention in an angular arrangement of the bearing for supporting radial and axial forces of a turbine unit for an underwater power generation plant.
Figure 10:
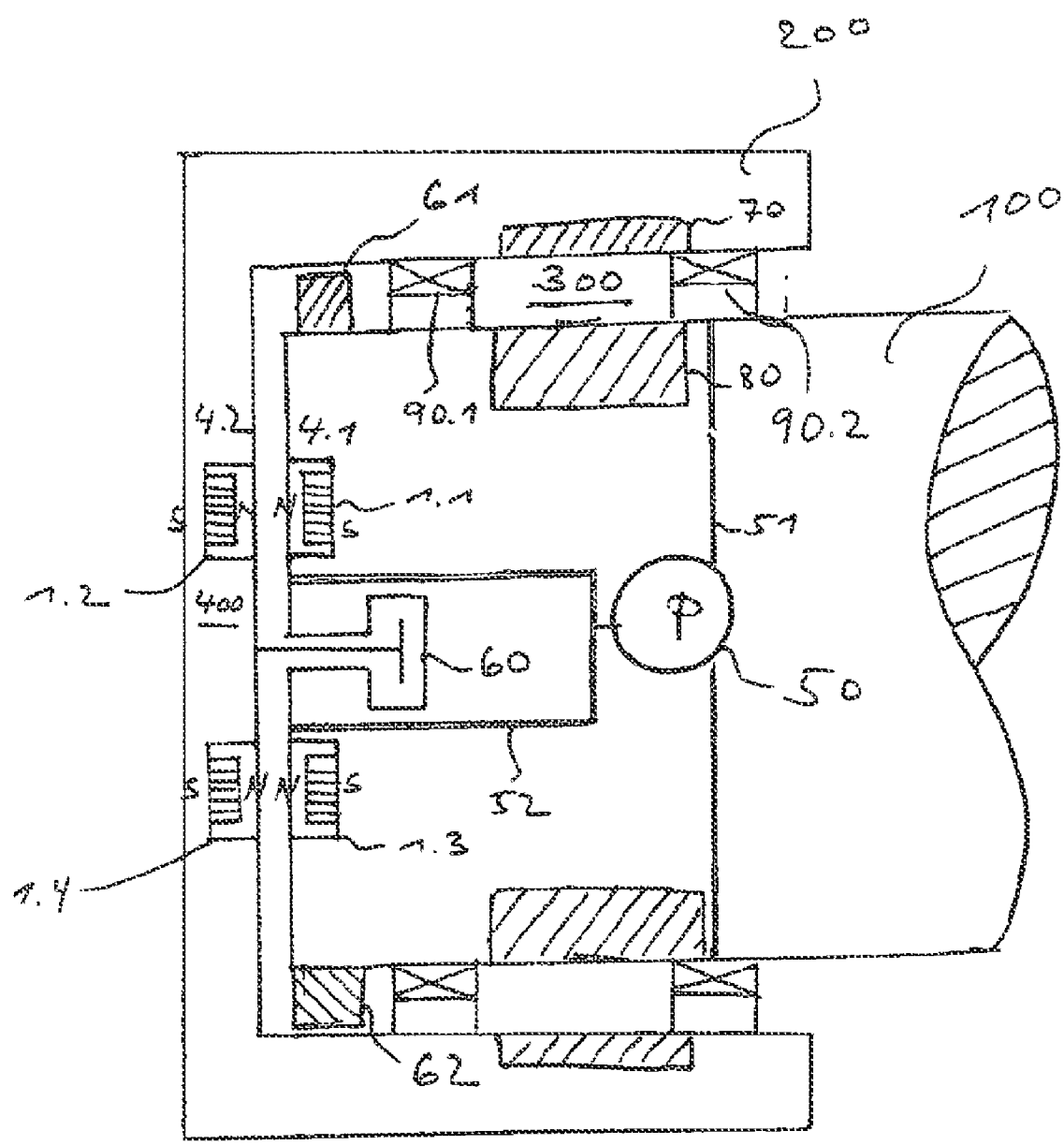
FIG. 10 shows a further embodiment of an underwater power generation plant with an axial bearing in accordance with the invention.

FIGS. 9, 10 and 11 show possible applications and embodiments for a hybrid bearing in accordance with the invention for arranging the bearing of revolving units of an underwater power generation plant. FIG. 8 shows a schematically simplified axial sectional view of parts of the gondola housing 200, with a hub 65 being held in the region of its outside circumference as a revolving element which forms a module with water turbine 66 (only shown partly) which is typically arranged in the form of a propeller. A generator rotor 70 is arranged in the hub 65 as a part of the electric generator. It can be realized by means of permanent magnets or an exciting winding. The generator stator 80 is housed in the stationary part, which is typically within the gondola housing 200. The air gap between the generator rotor 70 and the generator stator 80 must be guided as precisely as possible for this embodiment of a directly driven underwater power generation plant. Accordingly, the forces introduced by the water turbine 66 on hub 65 and additionally the magnetic forces in the electric generator must be intercepted by a bearing of the hub 65 which is arranged in the illustrated embodiment as an angular contact bearing 68.1, 68.2 and therefore have radial and axial force components. In accordance with the diagrammatic illustration in FIG. 8, the angular contact bearings 68.1, 68.2 are arranged as hybrid bearings in accordance with the invention. The sliding magnetic bodies 1.1 to 1.8 are introduced in the support bodies 4.1, 4.2 of the bearing halves, with the latter being partial components of the hub 65 and the gondola housing 200. Permanent magnets 3.1 to 3.8 are each embedded in the individual sliding magnetic bodies 1.1 to 1.8, which magnets are enclosed by elements made of slide bearing material 2.1 to 2.8, which on their part form parts of the sliding faces of the hybrid bearings. FIG. 8 further shows a lubricant pump 50 in connection with the lubricant lines 51, 52 which press lubricant into the angular contact bearings 68.1, 68.2.

FIG. 9 shows a further embodiment of the bearing components for an underwater power generation plant. In contrast to the embodiment as described above, a water turbine shaft 100 is present in the interior of a gondola housing 200, which shaft is driven at least indirectly by a water turbine not shown in closer detail. Simple rolling bearings 90.1, 90.2 are used as radial bearings for the illustrated embodiment. According to a preferred embodiment, which is not shown, slide bearings can be used instead of the rolling bearings. They can be ceramic slide bearings which are not necessarily arranged as hybrid bearings. The hybrid bearings in accordance with the invention are used for the axial direction in which higher bearing forces are introduced. Accordingly, sliding magnetic bodies 1.1 to 1.4 as a combination of one element made of a slide bearing material and a permanent magnet are inserted disk-like running surfaces. The combination of a classic slide bearing for the radial direction and a hybrid bearing in accordance with the invention in the axial direction is therefore advantageous because the relevant axial bearing forces are supported magnetically at least in part and the radial slide bearing contributes to the stabilization of the hybrid bearing.

According to one embodiment it is also possible to accommodate the sliding magnetic body in accordance with the invention with integrated permanent magnet in such a way that the radial bearing is relieved in an asymmetric way, which means the dead weight of the revolving units that are held is intercepted magnetically at least in part, so that especially the start-up of the plant is improved.

A damping element 60 is further provided, which can be realized in the form of a cylinder with a stamp immersing in a damping medium. Water is used as a damping medium in an underwater power generation plant. For the arrangement as shown in FIG. 9, there is a parallel arrangement of the damper with the actual axial bearing 400 which is used to dampen the oscillations of the bearings. In addition, a limit stop function can be integrated in the damper. Furthermore, rubber-elastic bodies 61 and 62 are used which limit or dampen the radial movement and thus additionally guide the radial movement in the axial bearing in addition to the rolling bearings 90.1, 90.2 and thus additionally stabilize the axial hybrid bearing in accordance with the invention.

FIG. 10 shows a further embodiment of an underwater power generation plant with a hybrid bearing in accordance with the invention, with the same being arranged according to FIG. 9 as an axial bearing 400. The sectional view shows the sliding magnetic bodies 1.1 to 1.4. The special aspect of this embodiment is the arrangement of the axial bearing 400 in the region of the outside circumference of the gondola housing 200. A large-size bearing is thus obtained which intercepts the forces introduced into the bearing in an especially efficient way. An annular chamber is formed as a damping element 60 in the hub 65 opposite of the axial bearing 400, which chamber is filled with lubricant or water for example in which a ram body 63 connected with the gondola housing 200 will immerse. Oscillations of the hub 65 in the axial direction are especially dampened thereby.

The axial hybrid bearings in accordance with the invention are symmetrical for two underwater power generation plants with inflow from two sides, which means the bearings are arranged on both sides on hub 65. A further embodiment of an axial bearing for supporting bidirectional axial forces is shown in FIG. 12 in a schematic simplified view. One hub 65 with a generator rotor 70 is radially held on a gondola housing 200 by means of rolling bearings 90.1, 90.2, in which housing the generator stator 80 is accommodated. Said radial bearing can also be arranged as a slide bearing or realized by a hybrid bearing in accordance with the invention. In order to support the axial forces, a bearing arrangement is provided on a collar 95 on the gondola housing 200 which engages in an annular groove 96 in hub 65, which groove is arranged as a counterpart. Sliding magnetic bodies 1.1, 1.2, 1.3 and 1.4 are provided on the axial wall surfaces of collar 95 and the recess 96, with the permanent magnets 3.1, 3.2, 3.3 and 3.4 of these sliding magnetic bodies cause a repulsive force in the bearing gap 5 on both sides of the collar 95. The arrangement thus acts in a damping manner, with preferably the hybrid bearing in accordance with the invention not being pretensioned in order to not reduce the magnetic supporting forces. That is why a sufficient bearing gap 5 is created, as outlined in FIG. 12, with the magnetic forces caused by the sliding magnetic bodies 1.1 to 1.4 centering the collar 95 in the annular groove 96 against outside action of forces.

A hybrid bearing arranged in accordance with the invention and the method in accordance with the invention for its production can advantageously be applied, in addition to underwater power generation plants, to other machines with a similar requirement profile with respect to bearing. This relates for example to wind power plants or large-size bearings of construction machines or machine tools.

LIST OF REFERENCE NUMERALS 1, 1.1, 1.2, . . . , 1.$n$ Sliding magnetic bodies
2, 2.1, 2.2, . . . , 2.$n$ Element made of slide bearing material
3, 3.1, 3.2, . . . , 3.$n$ Permanent magnet
4, 4.1, 4.2 Support body
5 Bearing gap
6, 6.1, 6.2 Sliding face
7 Recess
8 Flange
9, 9.1, . . . , 9.$n$ Soft-magnetic element
20 Elastic element
30 Shape of the sliding face
40 First partial component of the support body
41 Second partial component of the support body
42 Fastening means
50 Lubricant pump
51, 52 Lubricant lines
60 Damping element
61, 62 Rubber-elastic body
63 Ram body
65 Hub
66 Water turbine
68.1, 68.2 Angular contact bearing
70 Generator rotor
80 Generator stator
90.1, 90.2 Rolling bearing
95 Collar
96 Annular groove
100 Water turbine shaft
200 Gondola housing
300 Radial bearing
400 Axial bearing

The invention claimed is:

1. A hybrid bearing, comprising
a first bearing shell with a first support body and a first sliding face;
a second bearing shell with a second support body and a second sliding face, with the first sliding face and the second sliding face forming a slide bearing opposite of one another at a bearing gap;
a plurality of sliding magnetic bodies which are located in recesses in the first support body and/or the second support body and which form at least a part of the first sliding face and the second sliding face as segmented sliding faces;
each sliding magnetic body comprising one element made of a slide bearing material and a permanent magnet which is arranged spaced in relation to the associated sliding face, and which are joined into a module; and
wherein the surface of the element made of slide bearing material which faces towards the bearing gap is embedded in a step-free manner in the remaining sliding face which is formed by a material of the support body.

2. The hybrid bearing according to claim 1, wherein the first sliding face and/or the second sliding face is ground in.

3. The hybrid bearing according to claim 1, wherein the permanent magnet is enclosed completely by the respective element made of a slide bearing material.

4. The hybrid bearing according to claim 1, wherein the element made of slide bearing material is materially bonded with the respective permanent magnet.

5. The hybrid bearing according to claim 4, wherein the material bonding is achieved by gluing or sintering.

6. The hybrid bearing according to claim 1, wherein the sliding magnetic body is held on the associated support body by interlocking and/or positive engagement and/or material bonding.

7. The hybrid bearing according to claim 1, wherein the element made of slide bearing material comprises a ceramic element.

8. The hybrid bearing according to claim 7, wherein the element made of slide bearing material comprises a fiber-reinforced ceramic element.

9. The hybrid bearing according to claim 1, wherein the permanent magnet comprises rare earths.

10. The hybrid bearing according to claim 9, wherein the permanent magnet comprises either cobalt/samarium/boron or neodymium/iron/boron.

11. The hybrid bearing according to claim 1, wherein a lubricant is introduced in the bearing gap.

12. The hybrid bearing according to claim 11, wherein the lubricant is introduced in the bearing gap by means of a lubricant pump.

13. The hybrid bearing according to claim 1, wherein the hybrid bearing comprises a damping element.

14. An underwater power generation plant with a hybrid bearing according to claim 1.

15. The underwater power generation plant according to claim 14, comprising a water turbine held on a hub, which turbine is used for directly driving an electric generator, with the hybrid bearing being used as a radial and/or axial bearing of the hub.

16. A production method for a hybrid bearing, comprising a first and second bearing shell each of which comprises sliding faces which face one another at a bearing gap, said method comprising the following steps:

production of a first support body for the first bearing shell and a second support body for the second bearing shell;

production of a plurality of sliding magnetic bodies each by the connection of one element made of slide bearing material with a permanent magnet;

placing the sliding magnetic bodies into recesses in the support bodies, with a part of the element made of slide bearing material facing in the direction of the bearing gap and forming one segment of the sliding faces, and embedding the surface of the element made of slide bearing material facing the bearing gap in a step-free manner in the remaining sliding face which is formed by a material of the support body.

17. The method according to claim 16, wherein the sliding magnetic bodies are produced by a materially bonded connection of the permanent magnet and the element made of slide bearing material.

18. The method according to claim 17, wherein the element made of slide bearing material and the permanent magnet—are produced separately from one another and are joined by means of a gluing process.

19. The method according to claim 17, wherein the element made of slide bearing material is a ceramic element.

20. The method according to claim 19, wherein the ceramic element and the permanent magnet are joined by means of a common sintering process.

21. The method according to claim 19, wherein the permanent magnet comprises a polymer-based matrix material and is introduced in the plastic state into a recess of the element made of slide bearing material.

22. The method according to claim 16, wherein a magnetization of the permanent magnet is performed by means of an external magnetic field after the connection of the permanent magnet with the element made of slide bearing material.

* * * * *